United States Patent
Dean

[15] 3,682,329
[45] Aug. 8, 1972

[54] SHEET HANDLING APPARATUS

[72] Inventor: George A. Dean, Kansas City, Mo.

[73] Assignee: Libbey-Owens-Ford Company, Toledo, Ohio

[22] Filed: March 3, 1970

[21] Appl. No.: 16,044

[52] U.S. Cl. ..................................214/7, 214/1 BV
[51] Int. Cl. ............................................B65g 57/28
[58] Field of Search..........214/6 FS, 7, 1 BV; 271/74

[56] References Cited

UNITED STATES PATENTS

| | | | |
|---|---|---|---|
| 3,541,597 | 11/1970 | Segawa et al. | 214/7 |
| 3,326,547 | 6/1967 | Walters et al. | 214/6 FS |
| 3,279,664 | 10/1966 | Lynch | 214/7 X |
| 3,410,425 | 11/1968 | Guillaume | 214/7 |
| 2,441,757 | 5/1948 | Doering et al. | 214/7 X |
| 2,340,807 | 2/1944 | Grein et al. | 214/7 |
| 3,499,263 | 3/1970 | Stanley et al. | 214/7 X |

Primary Examiner—Robert J. Spar
Attorney—Collins and Oberlin

[57] ABSTRACT

Apparatus for receiving sheets from a horizontal conveyor and stacking them on edge. The sheets fall off the conveyor onto a pivotally mounted platen where they are retained by vacuum for transfer to a vertical position and stacking. Means are provided to automatically index the stack as each sheet is deposited and for transferring a completed stack away from the stacking apparatus.

9 Claims, 4 Drawing Figures

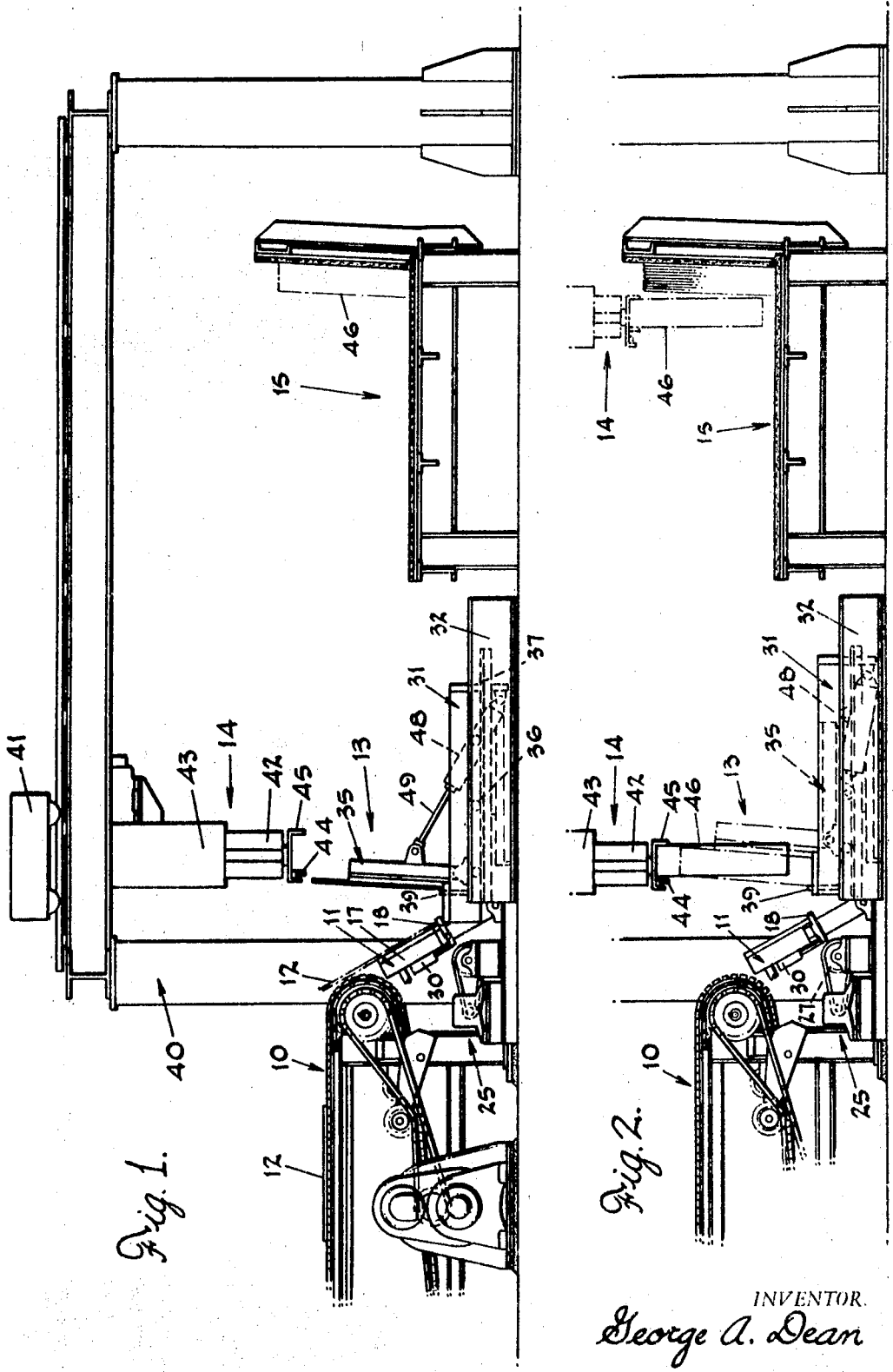

INVENTOR
George A. Dean
BY
Collins & Oberlin
ATTORNEYS 3,682,329

SHEET HANDLING APPARATUS

The present invention relates generally to apparatus for handling sheet materials, and more particularly to apparatus for handling horizontally disposed sheets as they come off a conveyor.

The invention has proved to be of particular utility in handling flat glass sheets and will be so described herein by way of example.

In most instances the fabricating processes associated with the production of flat glass products can be most conveniently carried out while the glass is lying flat on a horizontal conveyor. Within such processes, however, it is often necessary to transfer the sheets from a horizontal position to a vertical position and to stack a group of vertically disposed sheets for transfer to other process areas or to storage. While it has been found to be convenient to transfer relatively large sheets from the horizontal to the vertical by means of suction frames, such devices are relatively slow and they are essentially restricted to use at the end of operations such as sheet forming and grinding where the operation itself is relatively slow and the sheets are relatively large.

What the present invention is concerned with is the type of operation wherein relatively small sheets, such as those used as blanks for automobile windows, are being transferred and where the sheets travel rapidly. For example, in the embodiment illustrated herein the invention is depicted in connection with a conveyor which carries plates of glass such as automotive glazing blanks at a rate of one every two seconds. In a situation such as this a suction frame is not practical and the practice has been to unload the conveyor by hand, generally requiring two men who pick each sheet off the conveyor and stack it on a vertical buck. As each buck is loaded it is necessary to stop the conveyor while the loaded buck is moved out of the way and replaced by an empty one. In addition to an obvious saving in manpower, because of the relative fragility of glass it can be appreciated that while such hand operations are generally fast enough they are inherently dangerous.

Heretofore, attempts to mechanize such hand operations have been frustrated by the inherent problem of mechanically gripping sheet materials, and particularly sheets having a variety of shapes, without causing damage, as well as by the inherent slowness of known systems. A complicating factor in terms of automatic operation is the need to stack the sheets tightly together when they are placed on edge since any gaps within a stack can result in undesirable bending stresses.

The present invention provides a mechanical transfer apparatus which minimizes the need for gripping the sheets by using a combination of vacuum and mechanical means to perform intermittent catching and retaining functions between transfer operations. To accomplish this the invention provides a receiving platen, onto which the sheets fall by gravity at the end of a conveyor, which incorporates a vacuum braking device to stop a sheet before it strikes retractable stops at the bottom of the platen. The vacuum is released momentarily to allow the sheet to become aligned against the stops, and then restored to hold the sheet as the platen pivots to transfer it on edge onto a stacking carriage. The carriage automatically indexes as each sheet is stacked thereon and also includes means for keeping the sheets stacked tightly together.

According to another aspect of the invention provision is also made to remove a completed stack of sheets with minimum time loss. To do this the apparatus is adapted for use with a type of vacuum head which is capable of picking up a completed stack of sheets on edge and depositing it on a remote buck.

Accordingly, it is the primary object of this invention to provide apparatus for transferring horizontally disposed sheets from a conveyor to a support member spaced from the conveyor and for stacking them on edge thereon.

Another object of the invention is to provide sheet handling apparatus in which the support member indexes automatically as each sheet is deposited thereon.

Another object of the invention is to provide sheet handling apparatus which maintains the sheets stacked tightly together.

Another object of the invention is to provide apparatus for removing a stack of sheets collected on a support member and transferring it to a storage buck.

Other objects and advantages of the invention will become more apparent during the course of the following description when taken in connection with the accompanying drawings.

In the drawings, wherein like numerals are employed to designate like parts throughout the same:

FIG. 1 is a side elevation of a sheet handling apparatus constructed in accordance with the present invention, shown in position to receive sheets from a conveyor;

FIG. 2 is a side elevation similar to FIG. 1 but showing the apparatus in position to transfer a stack of sheets onto a waiting buck;

Figure 3:
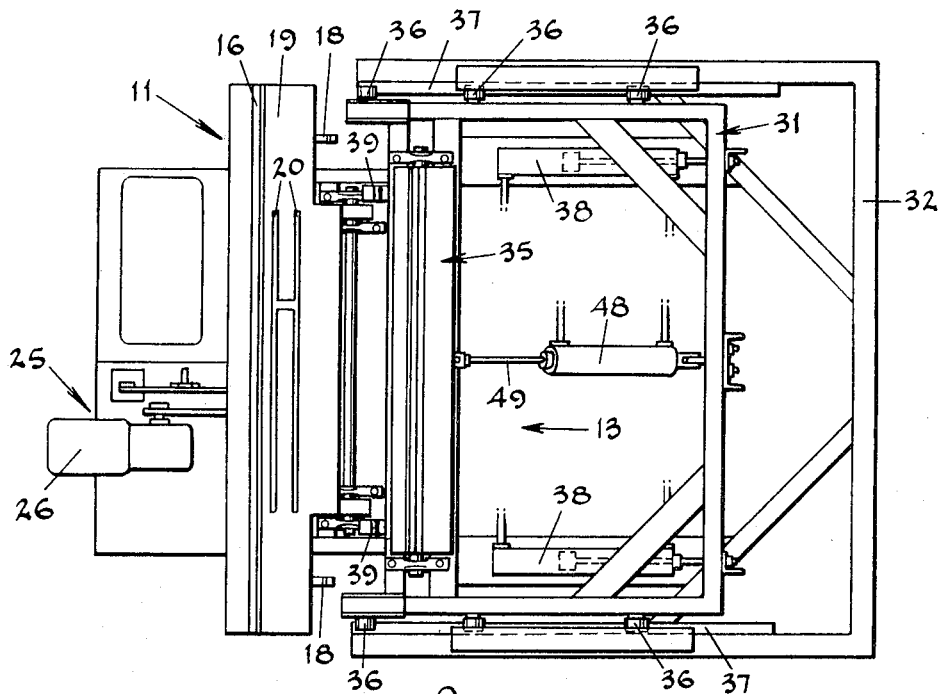
FIG. 3 is a plan view of the sheet receiving and stacking portion of the apparatus.

Referring to the drawings, FIG. 1 illustrates the novel sheet handling apparatus of the present invention installed at the end of a belt conveyor 10, and consists generally of a transfer mechanism which comprises a receiving platen 11 which catches the glass sheets 12 as they slide off the end of the conveyor, a support member or stacker 13 onto which the sheets are stacked on end, one by one, and a transfer head 14 which removes each stack of sheets collected on the stacker 13 and deposits the stack on a buck 15 or other convenient storage apparatus.

Figure 4:
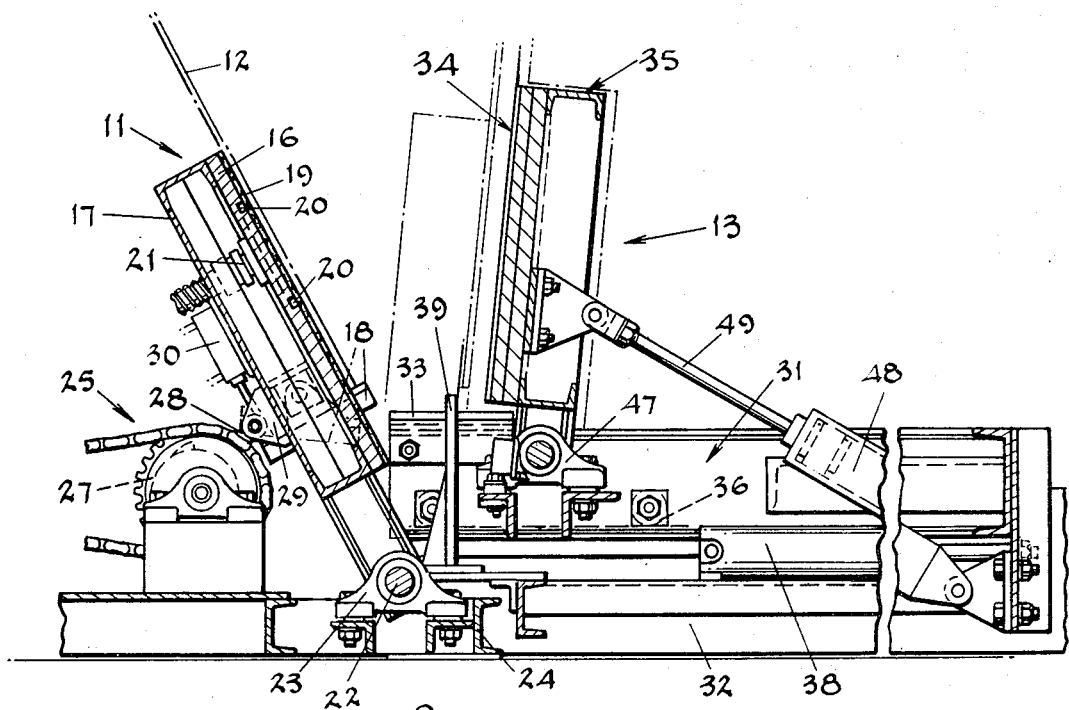
FIG. 4 is an enlarged side view of the sheet receiving and stacking portion of the apparatus shown partly in elevation and partly in section.

The receiving platen 11, shown in more detail in FIGS. 3 and 4, comprises a flat plate 16, a supporting frame 17, and retractable catches 18 disposed at the bottom of the plate 16 and adapted to catch and support a sheet after it falls onto the platen. The face of the plate 16 is covered with a thin pad 19 of a non-abrasive material such as felt, which forms a protective supporting surface for the sheets as they fall onto the platen.

To prevent the sheets from striking the catches 18 directly as they fall from the conveyor, vacuum braking means is provided within the plate 16. A cavity 20 (FIG. 3) is formed in the pad and in the plate and there is a vacuum hose connection 21 behind the plate which communicates with the cavity. The size and shape of the cavity is determined by the size and shape of the glass sheet 12 and by the capacity of the vacuum source. As the sheet slides down the plate and covers the cavity an instantaneous pressure drop occurs in the cavity which causes the atmospheric pressure on the side of the sheet opposite the cavity to force the sheet against the plate and thus halt its downward travel. In order to stop the sheet and to help maintain its alignment on the plate, the area of the cavity must be large enough to permit the necessary force to be generated and the cavity must be arranged on the plate in a way which will evenly distribute the force. As shown in FIG. 3 the cavity is in the form of two narrow, horizontal slots connected by a single vertical slot.

In the illustrated embodiment the slots and vacuum are adjusted such that the sheet will stop around 4 inches from the catches 18, and by means of a switch responsive to the magnitude of the vacuum built up the vacuum is momentarily released when a predetermined value is reached to permit the sheets to drop the remaining distance against the catches 18. A time delay circuit activated along with the vacuum switch then restores the vacuum to hold the sheet for subsequent operations.

To provide pivoting movement of the platen 11 and to deposit the sheet onto the stacking carriage 13 the frame 17 is mounted on a bar 22 which is journaled in bearings 23 mounted on a rigid frame 24. The pivoting force is provided by an actuator 25 comprising a motor 26, and a single revolution clutch 27, with the output of the clutch connected to the frame 17 by means of a crank arm 28 and pivot link 29. The crank is arranged so that at one extreme of its stroke the platen will be in the position shown in full line in FIG. 4, in which it is angled back toward the conveyor to receive the sheets as they fall of the end, and at the other extreme the platen will be in its deposit position shown in phantom in FIG. 4, where it is adjacent the stacker 13 to deposit the sheet thereon. It can be appreciated that the pivoting of the platen can be accomplished by other convenient means such as an hydraulic cylinder, with the extremes of platen position corresponding to the length of stroke of the piston.

The retractable catches 18 provide a positive means to insure that the sheets will be accurately positioned on the platen for transfer to the stacker 13, since misalignment can result in undesirable stress concentrations when the sheet is supported on edge on the carriage. As shown in FIG. 4 the catches 18 are pivotally carried by the platen frame 16 and are held in their glass-receiving position by latch means such as a pressure cylinder 30 having its ram acting downward against a rearward-extending portion of the latch. After the vacuum is restored the ram is retracted so that as the platen 11 moves to its deposit position the catches pivot to an out-of-the-way position as shown in phantom in FIG. 4.

The stacker 13 comprises a movable carriage 31 mounted on a stationary frame 32 and having a horizontal edge supporting surface formed by set-down pads 33, and a substantially vertical backing surface 34 formed on a backstop 35 upstanding therefrom.

As the receiving platen reaches its deposit position it is substantially parallel to the backing surface 34 and the sheet is a short distance from set-down pads 33 which are attached to the carriage 31 and suitably faced to protect the glass. The vacuum is then released, allowing the sheet to drop down onto the pads and the platen 11 is free to pivot back to its receiving position for another sheet.

Since the receiving platen pivots about a fixed axis, means must be provided for indexing the carriage as the stack is built up on it. According to the invention this is accomplished by mounting the carriage on rollers 36 which ride on a track 37 carried by the floor-mounted frame 32. To control the indexing movement of the carriage, constant-pressure cylinders 38 are mounted between the carriage 31 and the frame 32. These cylinders exert a constant biasing force against the carriage pushing it against carriage stops 39 which are mounted rigidly to the stationary frame 32. The stops 39 are mounted so that they interfere with the backing surface 34; therefore, when a sheet is against this surface, resting on the set-down pads 33, the sheet will be pressed between the backing surface and the stops 39, thus insuring that it is stacked tightly. The force exerted by the cylinders 38 is adjusted to be just sufficient to force a single sheet to be pressed flat against the backing surface or against a previously stacked sheet, and is somewhat less than the force which can be exerted against the pivoting receiving platen 11 by its actuator. The stops 39 are placed such that when the platen is in its deposit position its sheet supporting surface is slightly beyond the stops 39, so that as the sheet supported thereon contacts the backing surface 34 the carriage is pushed back, against the force of the cylinders 38, a sufficient distance to allow space for the sheet to drop between the stops and the surface 34. When the vacuum on the platen 11 is released the sheet 12 then drops into this space. As the platen 11 pivots back away from the backstop 35 the force of the cylinders 38 moves the backstop toward the stops as the sheet falls down with its edge flat against the pads 33. The sheet is then forced flat against the backing surface by the stops as force is exerted on the carriage by the cylinders 38.

As a subsequent sheet is transferred by the platen 11, the carriage is again moved back and the sequence is repeated so that the carriage is always indexed back a net distance of one sheet thickness as a new sheet is dropped between the stops 39 and the backing surface 34, the constant biasing force applied by the cylinders 38 insuring that the sheets are stacked tightly together.

When the desired number of sheets is stacked against the backing surface they can be banded or packed, or transferred to another fabricating area in a number of ways; however, one aspect of the invention makes it particularly adapted to an overhead type of transfer apparatus indicated generally by the numeral 14. This apparatus comprises a frame 40, an overhead trolley 41, and a pickup head 42 which depends from the trolley. The pickup head 42 is vertically movable in its housing 43 and comprises a pair of jaws 44 and 45 which are capable of gripping various size stacks. In operation, as best shown in FIG. 2 the head 42 descends until the jaws embrace a stack of glass 46 on the carriage. The jaws then close and the pressure is reduced inside the head, causing atmospheric pressure to force the glass vertically into the head. The entire stack can then be lifted and transferred to the buck 15.

In order to provide clearance for transferring the stack, the backstop 35 is made retractable. As shown in FIG. 4 the construction of the backstop is similar to that of the receiving platen 11 in that its frame is journaled in bearings 47 to pivot through a fixed angle, from the near-vertical position shown in FIGS. 1 and 4 to the horizontal position shown in FIG. 2. The retracting force is supplied by a pressure cylinder 48 pivotally anchored to the movable carriage 31 and having a ram 49 linked to the backstop.

In a typical operational sequence, sheets of glass 12 which have undergone some fabricating process, such as cutting to blank size, are moved out of that area on conveyor 10. As they reach the end of the conveyor they slide off onto the receiving platen 11. Once a sheet slides down far enough to cover the cavity 20, which is operatively connected to a vacuum source, a pressure differential is established between the cavity and the outside surface of the sheet, applying a braking force to the sheet and stopping it short of retractable catches 18. The vacuum is then momentarily released allowing the sheet to fall against the catches, and then restored to hold the sheet against the platen as the platen is pivoted to its deposit position. As the platen 11 approaches the end of its arc the sheet contacts the backing surface 34 and the pivoting force exerted on the platen causes the carriage 31 to move backward against the force of constant pressure cylinders 38. This places the sheet a short distance behind the carriage stops 39, whereupon the vacuum on the platen 11 is again removed and the platen started back to its receiving position. The release of the vacuum causes the sheet to fall onto set-down pads 33 behind the stops 39 and the cylinders 38 move the backstop toward the stops, pressing the sheet flat between the stops and the backing surface 34.

When the platen 11 returns to its receiving position another sheet can slide off the conveyor and the sequence is repeated, the movement of the backstop backward by the force of the platen making space for the sheet against those already stacked, and the force of the cylinders 38 against the stops 39 insuring that the sheets will be stacked tightly together.

Once a stack 46 of desired size is built up, the pickup head 42 descends and picks the stack up off the carriage. As the pickup head ascends the backstop 35 is retracted to a horizontal position (FIG. 2) and the trolley 41 transfers the stack to a buck 15, where a number of stacks can be collected before the buck is moved away and replaced by an empty one.

The entire operation can be keyed to the movement of the conveyor in order to insure that the platen 11 is always in its receiving position when a sheet leaves the conveyor and the subsequent control functions can be set up according to the known time intervals dictated by the speed of the conveyor, the spacing of the sheets, etc. The only deviation will occur when the stack is to be removed from the carriage, at which time the conveyor can be stopped momentarily.

It is to be understood that the form of the invention herewith shown and described is to be taken as an illustrative embodiment only of the same and that various changes in the shape, size and arrangement of parts may be resorted to without departing from the spirit of the invention.

I claim:

1. In apparatus for receiving each of a succession of substantially horizontally disposed sheets moving along a conveyor and stacking said sheets on edge in face-to-face relationship, a transfer mechanism including a support member spaced from the discharge end of said conveyor for supporting a stack of sheets, a platen disposed between said discharge end and said support member and being pivoted at one end to swing about a fixed axis disposed below the plane of said conveyor, a sheet supporting surface formed on said platen, means for swinging said platen back and forth about said axis between a first position wherein said supporting surface is inclined upwardly toward said conveyor and in position to receive a sheet as the sheet drops from said discharge end, to a second position wherein said support surface is substantially vertically disposed and adjacent said support member, and means for selectively preventing relative movement between said sheet and said support surface when a sheet is received thereon and as said platen moves from said first position to said second position and for releasing said sheet at said second position to deposit said sheet on said support member; said means for preventing relative movement between said sheet and said supporting surface comprising a cavity formed in said supporting surface in position to be covered by a sheet supported thereon, means for drawing a vacuum in said cavity, one or more catch members carried by said platen and selectively movable from an operable position protruding from said sheet supporting surface below said cavity and engageable with the leading edge of a sheet when said platen is in its first position to a retracted position behind said surface when said platen is in its second position, and means for selectively releasing said vacuum to permit a sheet to slide down said surface and onto said catch member.

2. Apparatus for handling sheets as claimed in claim 1, including control means operable to restore the vacuum in said cavity when said sheet contacts said catch means, to initiate movement of said platen from said first to said second position, and to release said vacuum when the platen reaches said second position.

3. Apparatus for handling sheets as claimed in claim 2, in which said control means comprises time delay means actuated upon attainment of a predetermined vacuum in said cavity.

4. In apparatus for receiving each of a succession of substantially horizontally disposed sheets moving along a conveyor and stacking said sheets on edge in face-to-face relationship; a support member spaced from the discharge end of said conveyor, on which said sheets are stacked, comprising a carriage mounted for horizontal movement toward and away from said discharge end, said carriage having a horizontal surface adapted to receive the edges of said sheets and a substantially vertical backing surface upstanding from said horizontal surface; biasing means comprising a pressure cylinder operatively connected between a fixed point and said carriage urging said carriage toward said discharge end; and a stop mounted in a fixed position relative to said carriage and engageable with said backing surface or a sheet stacked thereagainst to limit the movement of said carriage by said biasing means; said carriage being adapted for movement away from said discharge end against said biasing force while a sheet is being stacked thereon and then back toward said discharge end after a sheet is deposited.

5. Apparatus for handling sheets as claimed in claim 4, in which said vertical backing surface is formed on a backstop pivotally mounted on said carriage, and means are provided for swinging said backstop about said pivotal mounting between said substantially vertical position and a retracted position.

6. In apparatus for receiving each of a succession of substantially horizontally disposed sheets moving along a conveyor and stacking said sheets on edge in face-to-face relationship, a transfer mechanism including a carriage for supporting a stack of sheets spaced from the discharge end of said conveyor and mounted for horizontal movement toward and away from said discharge end, said carriage having a horizontal surface receiving the edges of said sheets and a substantially vertical backing surface; biasing means urging said carriage toward said discharge end; a fixed stop member located between said discharge end and said carriage and engageable with said vertical backing surface; a platen disposed between said discharge end and said stop member and being pivoted at one end to swing about a fixed axis disposed below the plane of said conveyor; a sheet supporting surface formed on said platen; means for swinging said platen back and forth about said axis between a first position wherein said supporting surface is inclined upwardly toward said conveyor and in position to receive a sheet as the sheet drops from said discharge end, to a second position wherein said support surface is substantially vertically disposed in alignment with said backing surface on said carriage and slightly beyond said stop member, said swinging means being capable of exerting a force on said platen greater than said biasing force whereby said carriage is moved backward against said biasing force as said platen reaches said second position; means for selectively preventing relative movement between said sheet and said support surface when said sheet is received thereon and as said platen moves from said first position to said second position, and for releasing said sheet at second position to deposit said sheet on edge on said horizontal surface of said support member; and means disposed above said carriage to engage a stack of sheets supported thereon and to transfer said stack clear of said carriage.

7. Apparatus for handling sheets as claimed in claim 6, in which said engaging means comprises a vacuum pickup head depending from an overhead trolley, said pickup head being capable of gripping and lifting a plurality of sheets stacked on edge.

8. In apparatus for receiving each of a succession of substantially horizontally disposed sheets moving along a conveyor and stacking said sheets on edge in face-to-face relationship, a transfer mechanism including a support member spaced from the discharge end of said conveyor for supporting a stack of sheets, a platen disposed between said discharge end and said support member and being pivoted at one end to swing about a fixed axis disposed below the plane of said conveyor, a sheet supporting surface formed on said platen, means for swinging said platen back and forth about said axis between a first position wherein said supporting surface is inclined upwardly toward said conveyor and in position to receive a sheet as the sheet drops from said discharge end, to a second position wherein said support surface is substantially vertically disposed and adjacent said support member, and means for selectively preventing relative movement between said sheet and said support surface when a sheet is received thereon and as said platen moves from said first position to said second position and for releasing said sheet at said second position to deposit said sheet on said support member; said means for selectively preventing relative movement between said sheet and said support surface including vacuum means carried by said platen and communicating with said sheet supporting surface for holding a sheet against said surface, said vacuum means comprising a cavity formed in said platen capable of being covered by a sheet received on said supporting surface, means for selectively drawing a vacuum in said cavity when it is covered by a sheet, and means responsive to the magnitude of the vacuum established within said cavity to release said vacuum when it reaches a predetermined level.

9. In apparatus for receiving each of a succession of substantially horizontally disposed sheets moving along a conveyor and stacking said sheets on edge in face-to-face relationship, a transfer mechanism including a support member spaced from the discharge end of said conveyor for supporting a stack of sheets, a platen disposed between said discharge end and said support member and being pivoted at one end to swing about a fixed axis disposed below the plane of said conveyor, a sheet supporting surface formed on said platen, means for swinging said platen back and forth about said axis between a first position wherein said supporting surface is inclined upwardly toward said conveyor and in position to receive a sheet as the sheet drops from said discharge end, to a second position wherein said support surface is substantially vertically disposed and adjacent said support member, and means for selectively preventing relative movement between said sheet and said support surface when a sheet is received thereon and as said platen moves from said first position to said second position and for releasing said sheet at said second position to deposit said sheet on said support member; said platen comprising a flat plate; a substantially rectangular frame comprising opposed side members supporting said plate; bearing means on which said platen pivots formed on said side members; a layer of non-abrasive material adhered to the unsupported surface of said plate, said material forming said sheet-contacting surface; a connector for a vacuum line attached to said plate and communicating with a cavity formed in the unsupported surface of said plate, said cavity further communicating with an aperture formed through said non-abrasive material; and a catch member pivotally attached to said frame and capable of assuming a first position protruding outward beyond said sheet supporting surface below said aperture in said material and a second position retracted behind said sheet supporting surface.

* * * * *